Oct. 16, 1945.　　　F. S. GREGORY, JR　　　2,386,891
MACHINE FOR MAKING PREFORMS
Filed Jan. 2, 1943　　　6 Sheets-Sheet 1
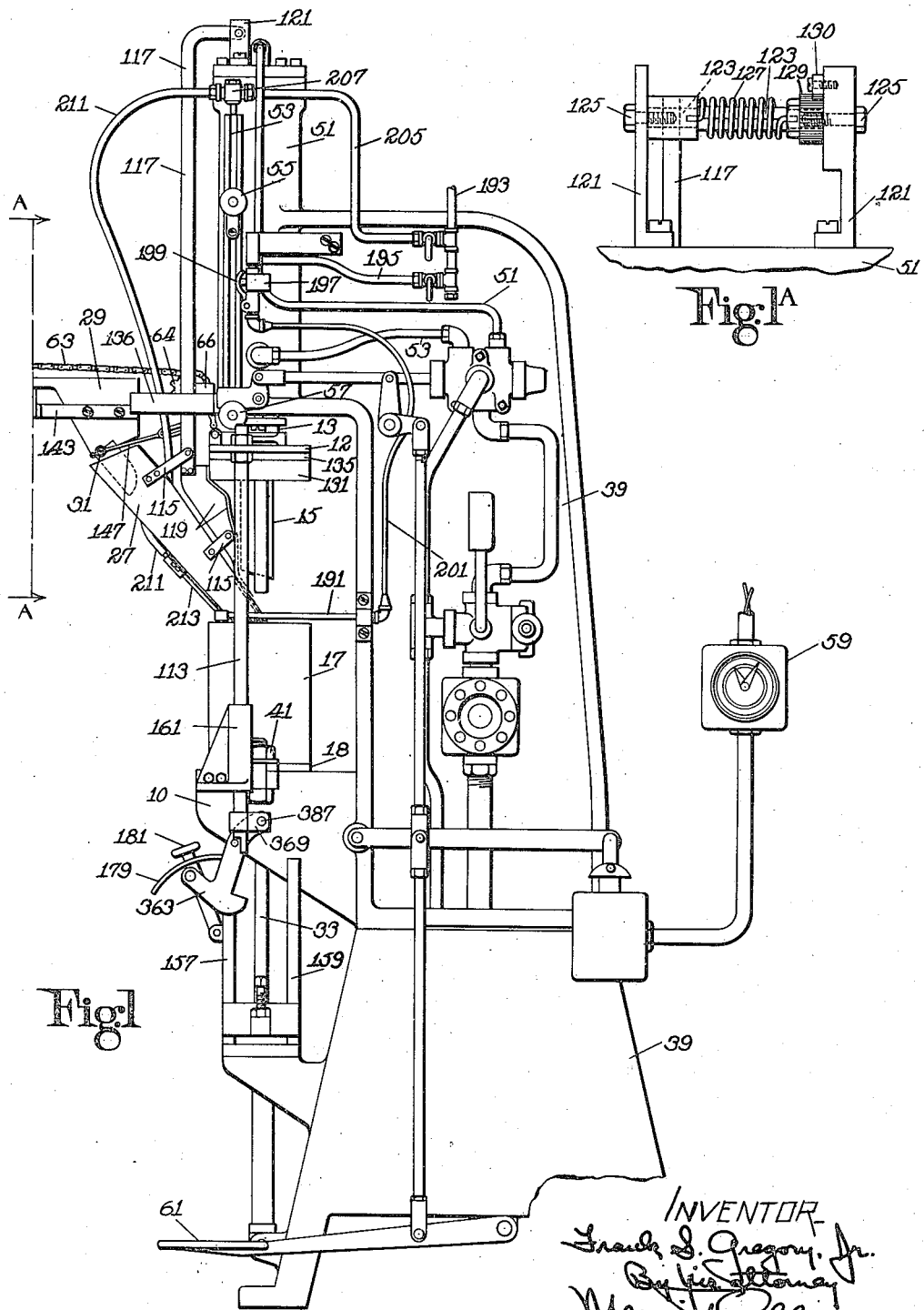

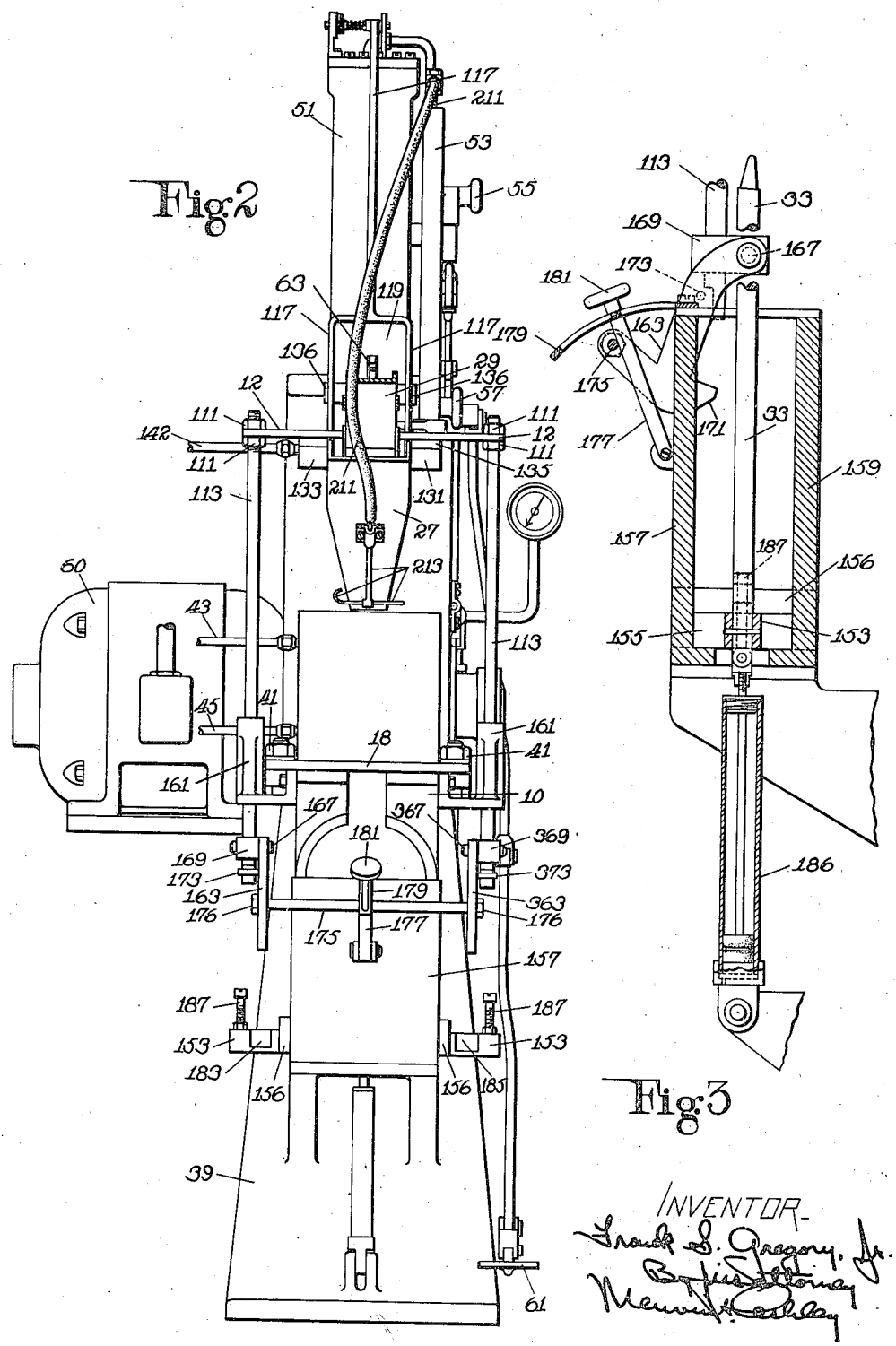

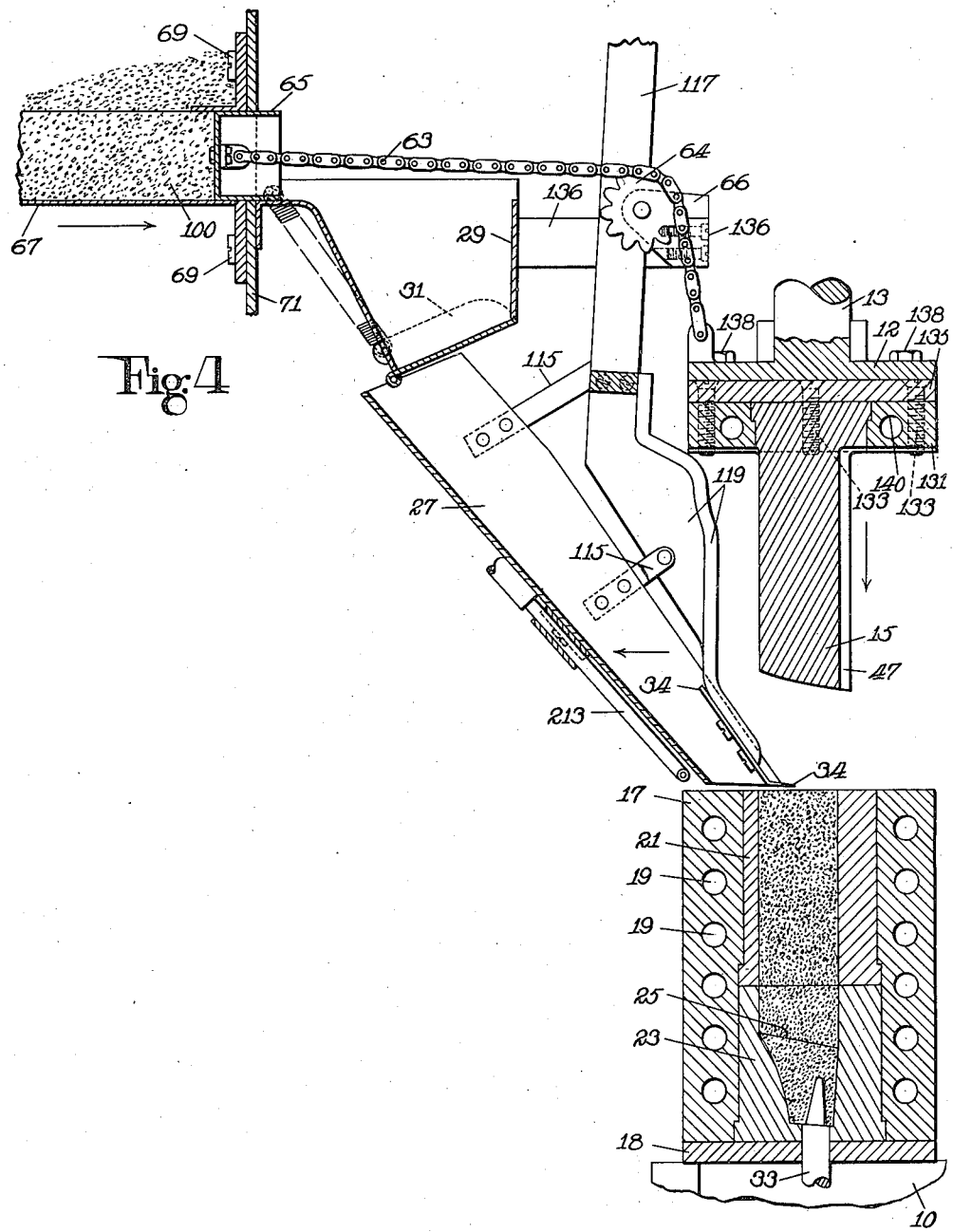

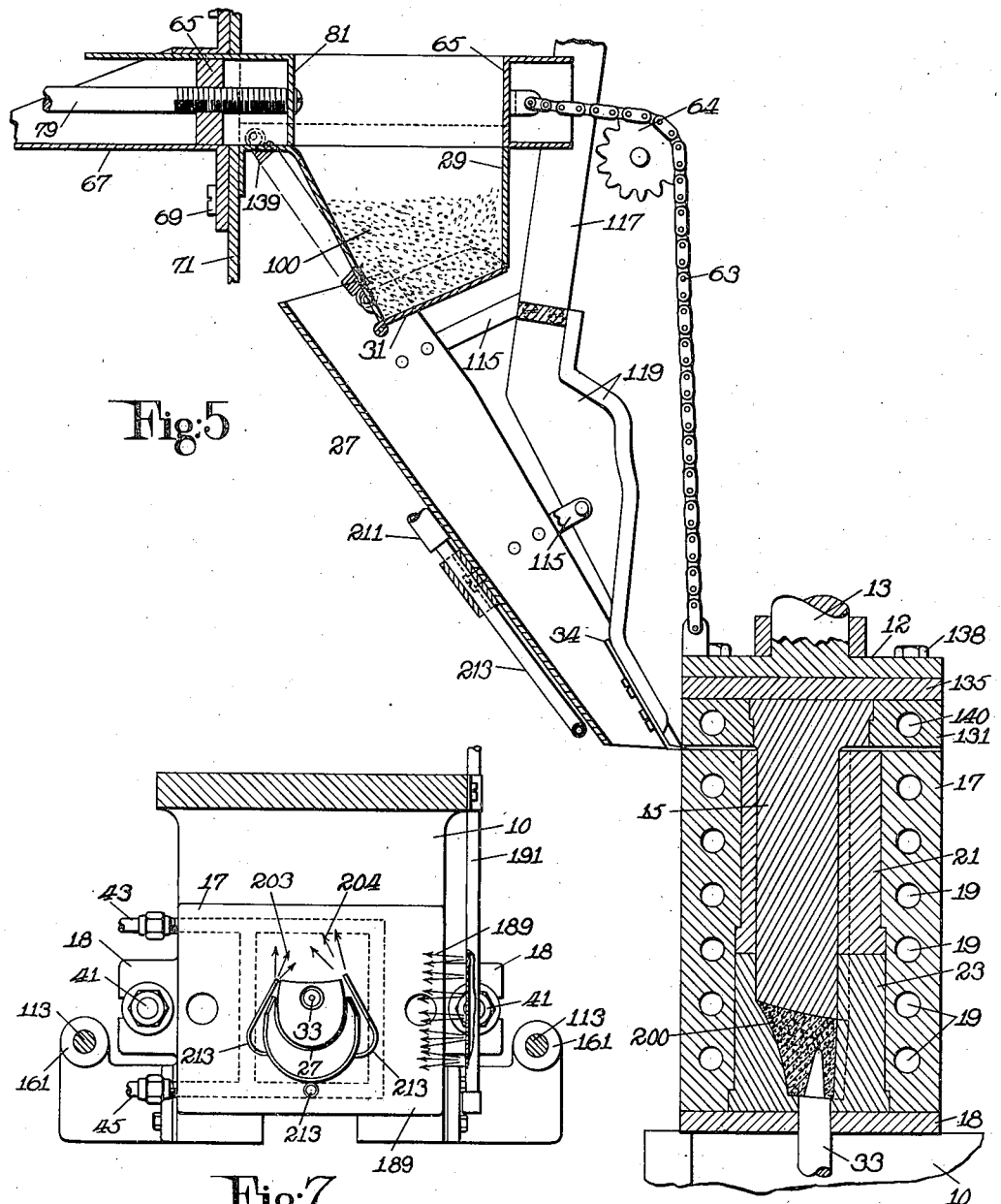

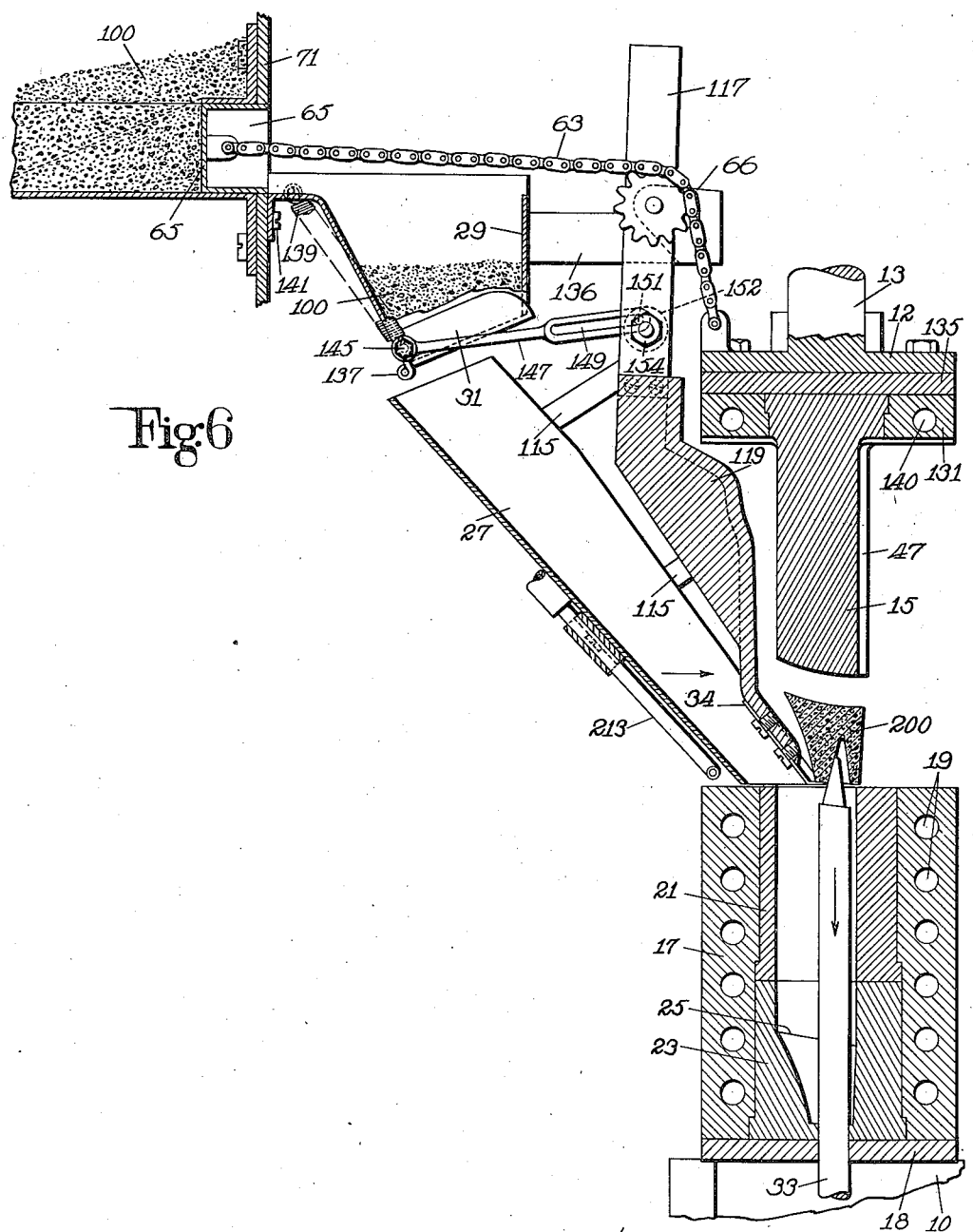

Patented Oct. 16, 1945

2,386,891

UNITED STATES PATENT OFFICE 2,386,891

MACHINE FOR MAKING PREFORMS

Frank S. Gregory, Jr., Arlington, Mass., assignor to B. B. Chemical Co., Boston, Mass., a corporation of Massachusetts Application January 2, 1943, Serial No. 471,106

7 Claims. (Cl. 18—16)

This invention relates to a machine for making from a finely divided, bulky molding compound a lightly compacted preform which is similar in shape to but somewhat larger than the desired finished article; and is herein illustrated as embodied in a machine for making such a preform, which is later to become a heel.

In th manufacture of articles such as heels which will receive and hold nails without being split or cracked, there is first made an intermediate article or preform. This preform is molded from a finely divided, bulky molding compound comprising a large proportion, commonly 85%, of a finely divided fibrous material such as wood flour and a comparatively small proportion, commonly about 15%, of a finely divided thermosetting resin. The mold used in making the preform is heated to a moderate temperature, for example in the neighborhood of 200° F.; and the pressure, which may be about 1 ton per square inch, is applied for a short interval, which may be a few seconds. The resin is thus softened but not cured; and the preform expands somewhat after being removed from the mold, being then similar in shape to but somewhat larger than the mold in which it was formed. The lightly compacted, bibulous preform thus produced may be coated with substances which will give the finished article a smooth surface to which lacquer will adhere. It is then given its final shape by molding it, preferably in a mold of the same size and shape as the mold in which the preform was made, under conditions of time, temperature and pressure sufficient to impart to the preform the desired shape and size of the finished article and to cure the resin. The method of making an article, including the making of a lightly compacted, bibulous, oversize preform, such as that which has been briefly described above, is not claimed herein but forms the subject matter of Letters Patent of the United States No. 2,330,233, granted September 28, 1943, upon an application in the name of Thomas C. Morris.

According to the present invention there is provided a molding machine having improved means for feeding a measured charge of molding compound into the mold. The illustrated machine, which is specially adapted to make from a bulky molding compound a lightly compacted, oversize preform, comprises a mold, a cooperating reciprocating plunger, a swinging chute for feeding molding compound into the mold and means operated by the movement of reciprocation for delivering a measured charge of molding compound to the chute.

This and other features of the invention, including certain details of construction and combinations of parts, will be set forth as embodied in an illustrated machine and pointed out in the appended claims.

Referring to the accompanying drawings,

Fig. 1 is a front elevation of the right-hand portion of a machine, including a press and mechanism for feeding measured amounts of molding compound to it, in which the present invention is embodied. In this figure there is shown the press and that part of the feeding mechanism which is located at the right of a vertical plane indicated by the broken line A—A, the remainder of the machine, which is located at the left of said vertical plane, being shown in Fig. 8;

Fig. 1A is a detail in elevation showing more particularly the mounting of the upper end of the long swinging arm;

Fig. 2 is a vertical section of the machine on the line A—A of Fig. 1 viewed from the left, the section being taken through the chain, so that, aside from the chain, Fig. 2 is an end elevation of the part of the machine shown in Fig. 1;

Fig. 3 is a detail in vertical section and upon an enlarged scale showing more particularly the knockout pin and the dashpot for cushioning the descent of the pin;

Fig. 4 is a detail principally in vertical section and on an enlarged scale showing the positions of certain parts after a measured charge of molding compound has been delivered to the mold by the swinging chute, the plunger having begun to descend and the chute having begun to swing to the left away from the mouth of the mold;

Fig. 5 shows the same parts in the positions which they occupy when the plunger has descended to compress the charge of molding compound and the chute has been swung to its extreme left-hand position;

Figure 8:
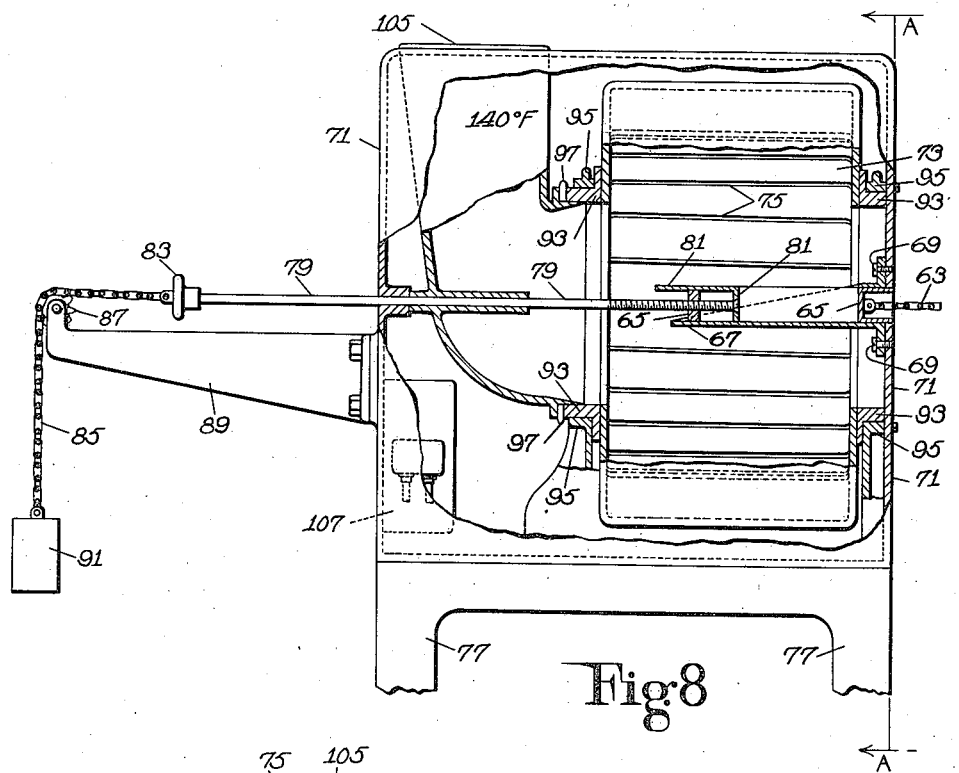
Figure 9:
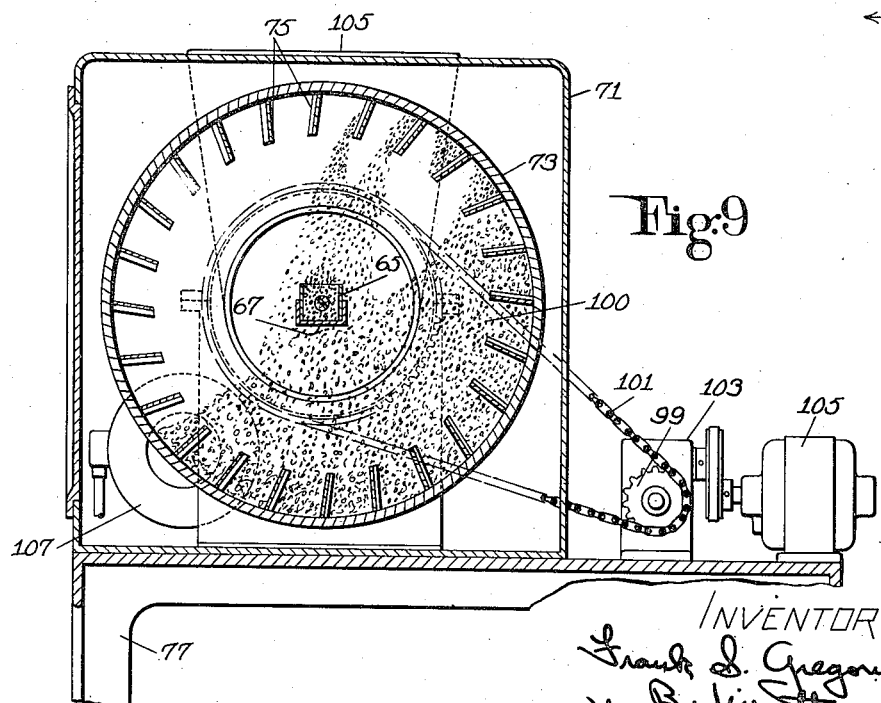

Fig. 6 is a view of the same parts in the positions which they occupy when the plunger has been raised to its extreme upper position, the intermediate article or preform having been pushed up out of the mold, and the chute being in process of swinging to the right to eject the preform from the machine. In this figure the vertical section has ben taken in a plane somewhat nearer to the observer than in Figs. 4 and 5 to show the link which at proper times opens the hinged bottom of the hopper;

Fig. 7 is a view on a scale somewhat larger than that of Figs. 1 and 2 looking down upon the mold, a part of the frame of the press and the lower portion of the swinging chute being shown;

Fig. 8 is an elevation of the box in which is located the drum for holding a supply of molding compound and the measuring slide to which the drum delivers molding compound, a part of one wall of the box having been broken away to show in vertical section the measuring slide and the generally funnel-shaped hollow member through which molding compound may be poured into one end of the drum; and Fig. 9 is a view principally in section showing more particularly the vanes on the interior of the drum and how they deliver molding compound to the measuring slide.

Before describing the machine in detail a general description of its mode of operation will be given. The machine comprises a press and certain mechanism for delivering molding compound to the mold of the press (Fig. 1) and mechanism (Fig. 8) for feeding measured charges of molding compound to the mechanism which delivers the molding compound to the mold. Referring to Fig. 4, the press includes a platen 10 above which is located a reciprocable ram comprising a plate 12 and a stem 13. A plunger 15 is fastened to the ram, and upon the platen is fastened a mold member. As herein shown, this member comprises a jacket 17, passageways 19 through which a heating medium such as steam is forced, a base plate 18, and a mold proper which consists of an upper part 21 and a lower part 23, the mold cavity lying below the level indicated by the line 25. The jacket 17 with the mold parts 21, 23 and the base plate 18 are bolted together. The mold has a long throat above the cavity, said long throat being necessitated by the nature of the molding compound which, as has been stated above, is bulky. The ram of the press, and consequently the plunger 15, is reciprocated continuously in such manner that there is a short dwell every time the plunger reaches its lowermost position. A swinging chute 27, which normally occupies its extreme right-hand position when the plunger is at the top of its stroke and the preform has been ejected, receives measured charges of molding compound 100 from a hopper 29 and delivers it into the mold.

In Fig. 4 the chute has delivered such a charge, which has filled the mold, and is swinging to the left, while the plunger is descending. As the plunger descends, a charge of molding compound is delivered to the hopper 29 but remains in said hopper until the plunger has completed its downward stroke and is at the top of its upward stroke. The downward stroke has been completed in the position of parts shown in Fig. 5; and it will be noted that a succeeding charge of molding compound has been delivered to the hopper 29 and is still being held there owing to the fact that a hinged member 31 with upstanding side walls forms the bottom of the hopper and is in closed position. During the rise of the plunger, after it has compressed a charge of molding compound into the form of the mold cavity, as shown at 200, a knockout pin 33, the upper end of which extends into the molded preform 200, rises and pushes the preform out of the top of the mold. The pin then starts to descend, as shown in Fig. 6. In the meantime, the chute 27 has been swinging to the right under the influence of a torsion spring which will be described later. In the position of parts shown in Fig. 6, the projecting beveled end of a small plate 34, fastened by screws to a cam which is rigid with the chute 27, has slid under the preform so as later to cause the preform to be stripped from the knockout pin. The edge of this stripping plate is in contact with the upper end of the descending knockout pin; and it is this contact which normally prevents the chute 27 and the cam from swinging farther to the right. The moment the knockout pin 33 has descended far enough to free the preform, the chute swings quickly to the right and ejects the preform from the machine. At the same time, that is, when the chute swings quickly to eject the preform, the hinged bottom 31 of the hopper 29 is swung down to permit the measured charge of molding compound 100 in the hopper 29 to flow down the chute 27 into the mold. The plunger then starts down for the next stroke, and the parts presently pass once more through the positions shown in Fig. 4. The construction is such that all the movements which have been described above are derived from the reciprocating movement of the ram.

The press (Figs. 1 and 2) comprises a frame 39 having the platen 10 upon which the base plate 18 of the mold rests and to which it is fastened by two oppositely located bolts and nuts 41. One of these bolts passes through open-ended slots in alined ears formed respectively on the platen and on the base plate (Fig. 1). The other bolt (Fig. 2) clamps the other end of the base plate to the platen. The mold is heated by steam which enters through an inlet pipe 43 and leaves through an outlet pipe 45. The plunger, best shown in Figs. 4, 5 and 6, which has a concavely curved face 47 to correspond to the concavely curved face of the opening in the mold, is fast to the ram of the press.

Since the details of construction of the press itself form no part of the present invention, only a general description of its mode of operation will be given. The ram (Figs. 1 and 2) is reciprocated by oil under pressure which is forced alternately into the top and the bottom of an upright cylinder 51 and thereby causes successive reciprocations of the ram and with it, of course, of the plunger, these reciprocations including a short dwell of the plunger at the bottom of its stroke so as to hold the preform under compression for a short interval. The location of the path of the plunger, that is, its extreme upper and lower positions, may be varied by varying the positions of two spaced stops which are vertically adjustable in an upright guideway 53, and may be locked in adjusted position by turning knobs 55, 57. The guideway 53 is fast to and reciprocates with the ram and plunger. The length of the dwell may be varied and is controlled by a "Flexopulse," a commercial apparatus, the dial and pointers of which are shown at 59. Assuming that a switch, not shown, has been turned to start the motor 60 (Fig. 2), the function of which is to pump the oil which causes reciprocation of the ram, the operation of the press is started by turning a switch, also not shown, in the "Flexopulse" apparatus, whereupon the operation of the press is continuous, the ram reciprocating and dwelling for an interval at the bottom of its stroke. Since it is desirable at times to operate the press slowly, for example in order to facilitate locating the stops which are held in adjusted position by the knobs 55, 57, a treadle 61 is provided. Pushing the treadle down causes the ram to descend; and releasing it causes the ram to rise. As has been stated, however, the press ordinarily runs continuously. No further description of the construction and the mode of operation of the press will be given since, as has been stated, the details of its construction form no part of the present invention.

The machine of the present invention comprises a press, such, for example, as that briefly described above, fitted with a mold and a reciprocating, cooperating plunger, means for feeding measured charges of molding compound to the mold, means for removing from the top of the mold before the plunger has completed its descent any of the powdered or granulated molding compound which may have been spilled or scattered there, means for pushing the molded preform out of the mold, and means for ejecting the molded preform from the machine, the operation of all these means being derived from or controlled by the movements of reciprocation of the plunger.

Referring to Fig. 1, it has been explained that measured charges of molding compound are delivered from a supply into the hopper 29 and flow at the proper times from the hopper into a chute 27, which in turn delivers the molding compound into the mold. As shown in Fig. 1, as well as in Figs. 4 to 6, the right-hand end of a chain 63 is fast to the ram of the press, said chain passing over a sprocket 64 carried by a block 66 which is fastened to the thick base of the U-shaped guide member 136, later to be described, said thick base being fastened to the cylinder 51. The left-hand end of the chain (Fig. 8) is fast to the forward end of a small measuring slide 65 which is slidable horizontally in a guide member 67, the forward end of said guide member being fastened by screw bolts 69 to the forward wall of a box 71, there being in said wall a rectangular opening in line with the measuring slide. The slide has no top or bottom, the lower wall of the guide 67 closing the opening in the bottom when the slide is in the position shown in Fig. 8. In this position it is loaded through its open top by means of a rotating drum 73 which contains a quantity of molding compound and is furnished on its interior cylindrical wall with a series of inwardly projecting vanes 75. The box 71, in which the drum 73 is rotatably mounted, is supported on a stand 77 at the left of the machine, as viewed in Fig. 1, so that, when the plunger of the machine descends and pulls the chain 63 to the right, the slide 65 is pulled to the right and a measured charge of molding compound is delivered into the hopper 29, as shown in Fig. 5.

Returning now to Fig. 8, the forward end of a small rod 79 is threaded through the rear wall of the measuring slide, its front end being attached to the vertical portion of an L-shaped member 81 in such manner that the rod may be rotated but is held from longitudinal movement with respect to the L-shaped member. Consequently, by rotating this rod the L-shaped member may be adjusted to the right or the left to vary the capacity of the measuring slide 65. This rod 79 extends to the left through a bearing in which it is slidable, projects from the left-hand end of the box 71 and has fastened to its outer end a hand-hold 83 by which it may be turned. In order to exert at all times a pull on the rod 79 to urge it to the left, a plug is held in the end of the rod in such manner that the rod may be rotated with respect to it, and to this plug is fastened one end of a chain 85. This chain runs over a sprocket 87 rotatably mounted at the end of a stationary arm 89, and has at its depending end a weight 91. By this construction the reciprocation of the plunger 15 causes the measuring slide to reciprocate horizontally so that it first receives a charge of molding compound and then delivers the charge to the hopper 29. The drum 73 has hollow trunnions 93 at each end which are rotatably mounted in bearings 95, a sprocket 97 being provided on the left-hand trunnion. Around this sprocket and around a small sprocket 99 (Fig. 9) runs a chain 101, the small sprocket being driven through a reduction gear 103 from a small motor 105. In order to permit molding compound to be poured into the drum, a stationary hollow filling member 106 has its lower end bent and extending into the interior of the left-hand trunnion 93. A combined heater and fan 107 is provided in the box to keep the temperature at about 140° F. The molding compound, as will be explained later, receives a preliminary heat treatment before it is poured into the drum.

Returning now to Fig. 2, the plate 12 of the ram is an elongated one which extends outwardly on both sides of the ram and has fastened to its outer ends by nuts 111 the upper ends of two vertical rods 113. These rods reciprocate with the plunger and serve, through mechanism later to be described, to lift the knockout pin 33, which pushes the molded preform out of the mold, and then to allow the pin to descend by gravity.

Referring to Figs. 1, 2 and 6, the swinging chute 27 is rigidly fastened by four straps 115, two of which are shown in Figs. 1 and 6, to a swinging member consisting of a long arm 117 which is forked (Fig. 2) at its lower end and has fastened between the branches of the fork a cam 119. The long arm 117 has at its upper end a right-angled bend, the extreme outer end of which is pivoted so that the arm may swing toward and from the cylinder 51. To permit this swinging (Fig. 1A) two spaced upright standards 121 are fastened to the top of the cylinder 51. Extending horizontally between the standards is a rod 123, the right-hand portion of which is square in cross section and the left-hand portion rounded. The round stems of screw bolts 125, which pass through alined bores in the standards and are threaded into the opposite ends of the rod 123, form bearings about which the rod may turn. A hub at the extremity of the bent portion of the long arm 117 is rotatably mounted on the round portion of the rod 123. One end of a torsion spring 127, which is wound about the rod, is fastened to the hub of the arm 117; the other end of the spring being fastened to a ratchet wheel 129 which is rigid with the rod, said ratchet wheel being held from turning in one direction by a small pawl 130 pivoted to the right-hand standard 121. The ratchet may be turned in the opposite direction to increase the tension of the torsion spring 127. The long arm 117, to which the chute 27 is fast, is guided in its swinging movements by a horizontally extending U-shaped guide 136 the base of which, as has been stated, is fast to the cylinder 51, and the arms of which embrace the lower forked portion of the arm 117, as shown in Fig. 2.

Referring to Fig. 4, the plunger 15 has an enlarged upper end which is shouldered as shown. A comparatively thick plate 131 has an opening in its center which is shouldered to receive the shouldered portion at the upper end of the plunger. This plate is fastened by screws 133 to a plate 135 which in turn is fastened to the plate 12 by cap screws 138. In the thick plate 131 is a passageway 140 through which steam is forced to heat the plunger. The flexible pipe through which steam is forced into the passageway 140 is shown at 142 in Fig. 2, the flexible outlet pipe not being shown. The alined left-hand edges of the plates 131, 135, which are in effect the head of the plunger, form a vertical face with which the upper vertical face of the cam 119 contacts when the parts of the machine are in the positions shown in Fig. 1. When the plunger descends, it causes the cam 119, which is fast to the lower end of the long forked arm 117, to swing to the left in a manner determined by the irregularly curved face of the cam, it being remembered that the coiled torsion spring 127 (Fig. 1A) at the top of the long arm 117 continually urges the arm and with it the chute 27 to swing to the right. As the plunger rises, the chute 27 swings back to the position shown in Fig. 1.

The reciprocating movement of the plunger also causes opening and closing of the hinged bottom 31 of the hopper 29 at the proper time. To this end (Fig. 6) the hinged bottom 31 is pivoted to the hopper 29 at 137. To a pivot on the outside of the upstanding wall of the hinged bottom, which is remote from the observer, is attached the lower end of a tension spring 139, the upper end of said spring being attached to a pin on the far side of the hopper 29. The hopper is fastened by screws, one of which is shown at 141 (Fig. 6), and by straps, one of which is shown at 143 (Fig. 1), to the forward wall of the box 71 from which measured charges of molding compound are delivered to the hopper 29 by the measuring slide 65. The tension spring 139 (Fig. 6) tends always to urge the hinged bottom 31 into closed position and to hold it closed. In order to swing this bottom to open position at the proper times and then to allow the spring 139 to close it again, a pin 145 is carried by one of the upstanding walls of the hinged bottom, said pin being in alinement with the pin to which the lower end of the tension spring 139 is fast; and on this pin 145 is pivoted one end of a link 147, the other end of which is provided with an elongated slot 149 to receive a pin 151. This pin projects from the far side of a disk 152 on the far side of the arm 117, said disk having a stem which passes through a hole in the arm and has threaded on its end a nut 154 to hold it in any adjusted angular position. The axis of the pin 137, about which the hinged bottom 31 swings, and the common axis of the alined pins, to one of which the lower end of the tension spring 139 is fastened and about the other of which 145 the link 147 is pivoted, are so located that the opening and closing of the hinged bottom 31 is rapid. In the position of parts shown in Fig. 1, in which the plunger is at the top of its stroke and the swinging chute 27 has just ejected a molded preform from the machine, the hinged bottom 31 has been swung down to open position and the mold has been filled with a charge of molding compound. In Fig. 6, which shows the positions of the parts just prior to the position shown in Fig. 1, the plunger, as in Fig. 1, is at the top of its stroke; but the swinging chute 27 is being held from further movement to the right by the upper end of the knockout pin 33. The hinged bottom 31 is still closed, but the right-hand end of the slot in the link 147 are in engagement with the pin 151 carried by the long arm 117 which is being urged to swing to the right by the coiled spring 127 (Fig. 1A). Consequently the moment the knockout pin 33 descends far enough, the chute 27 and the long arm 117 with its cam 119 will swing to the right until the upper vertical portion of the face of the cam contacts with the adjacent alined vertical faces of the plates 131, 135. This movement will cause the hinged bottom 31 of the hopper to swing down into the position shown in Fig. 1.

The knockout pin 33 is lifted by the movement of the rods 113 at the proper times and is then allowed to fall by gravity. The lower end of this knockout pin (Fig. 3) is fastened to a long horizontal bar 153 to which are fastened two short, spaced crossbars, one of which is shown at 155. The ends of these crossbars have a sliding fit in a vertical guideway formed in a member which is rigid with the frame of the machine, the walls of this guideway being indicated at 157 and 159. Also fast to the long bar 153 are two crossbars 156 (Fig. 2) which are longer than the crossbars 155 and extend across the vertical edges of the walls 157, 159 of the guideway. These two sets of crossbars 155, 156 are in effect guides to insure that the knockout pin 33 shall rise and fall in a straight unvarying path. The upright rods 113, which reciprocate with the plunger, are vertically slidable in long bearings 161 which are rigid with the frame of the machine. As the rods descend, two latches 163, 363, carried respectively at the lower ends of the rods, engage the under side of the long bar 153; and, when the rods rise, cause the knockout pin 33 to rise with them until this pin has pushed the molded preform up out of the mold, whereupon the latches are disengaged from the long bar 153 which is permitted to descend by gravity. In Fig. 6 the knockout pin 33 is shown in the position which it occupies just after it has started to descend.

Referring again to Figs. 1, 2 and 3, since the latches 163, 363 and their mountings are alike, only one latch and its mounting will be described in detail. Referring to Fig. 3, the latch 163 is pivotally suspended from a pin 167 carried by a small block 169 which is fast to the lower end of one of the rods 113, the pivot pin 167 being received in a bore in the upper end of the stem of the latch. The latch has a nose 171 provided with a flat surface adapted, when the rods 113 have descended far enough, to engage the under side of one end of the bar 153. The other latch 363 simultaneously engages the other end of the bar so that, when the rods 113 rise, the bar 153 and with it the knockout pin 33 will be lifted. Referring again to the latch 163, said latch carries a small stop pin 173 which, when it contacts with a flat surface formed by cutting away a part of the lower end of the rod 113, limits the swinging of the latch to the right. This latch also has a tail through the outer end of which and through the outer end of the tail of the other latch 363, passes a small horizontal rod 175 held in place by nuts 176. The rod 175 is adapted to slide along the outer side of an obliquely extending guide rod 177 which is square in cross section. This obliquely extending guide rod is pivoted at its lower end on a stationary pin and extends up through an elongated slot in a rigidly held curved plate 179. A small hand-hold 181, threaded upon the upper reduced end of the rod 177, furnishes means for clamping the rod in adjusted position. By means of this hand-hold the rod may be adjusted to and clamped in the desired oblique position. Near the ends of the long bar 153 (Fig. 2), which carries the knockout pin 33, are formed notches 183, 185 which are in line with the latches 163, 363. These notches have inclined bottoms so that the curved under faces of the noses of the latches will ride down over said bottoms. One latch 163 and its mounting has been described above. To the other latch and its associated parts (Fig. 2) have been applied the same reference numerals increased by 200 as have been applied to the latch 163 and its associated parts.

Assuming that the parts of the machine are in the position shown in Figs. 2 and 3, with the plunger 15 and the rods 113 in their uppermost positions and the long bar 153, by which the knockout pin 33 is carried, in its lowermost position, the operation during one reciprocation of the rods 113 is as follows. As the rods 113 descend, the latches 163, 363 swing to the right, as viewed in Fig. 3, the horizontal rod 175 sliding down on one side of the oblique guide rod 177. Near the bottom of the downward movement, the under sides of the noses of the latches strike the inclined bottoms of the notches 183, 185 in the bar, swing somewhat to the left and then finally to the right so that the latches engage the under side of the bar. The small stop pins 173, 373 are at this time in contact with the flat faces of the lower end of rods 113. By the upward movement of the vertical rods 113, the long bar 153 is lifted until the knockout pin 33 has pushed the molded preform out of the mold, whereupon the latches are disengaged from the bar, which is then permitted to descend by gravity. In order to cushion the descent of the comparatively heavy long bar 153, a dashpot 186 is provided, the stem of the piston of which is pivoted to an ear on the under side of the bar. In order to avoid any possibility that the long bar 153 may sometime stick in a position part way down, there are at the ends of the bar respectively screws 187; and if by chance the long bar 153 happens to stick part way down, then on the next descent of the rods 113, the blocks 169, 369 at the lower ends of said rods will strike the tops of the screws and push the long bar 153 down.

When the charge of molding compound runs down the swinging chute 27 and fills the mold, a small amount of molding compound is liable to be scattered on the flat top of the mold. In order to remove any compound which may lie on the flat top of the mold, an air blast is provided for blowing it off, said air blast being rendered operative by the plunger in its descent. This air blast is indicated by the small arrows 189 (Fig. 7). The jets of air flow horizontally across the top of the mold from a horizontal row of perforations in a horizontal pipe 191. Referring to Fig. 1, compressed air enters a pipe 193 from a source of supply, flows down, then to the left through a substantially horizontal pipe 195 and into a valve casing 197, having in it a valve provided with a pivoted handle 199. The valve is normally held closed by a small spring-pressed plunger which acts on the valve handle. Whenever this valve is opened, compressed air flows from the valve casing through a pipe 201 to the horizontal pipe 91 and emerges in a series of small jets, as indicated in Fig. 7. When the plunger in its descent reaches a position in which the lower end of the plunger has entered the mold, the knob 55 engages the handle and opens the valve so as to blow off from the top of the mold any of the molding compound which may have been scattered there. Of course, when the plunger rises, the valve is opened again during said rise; but this opening of the valve with the resulting blast of air across the top of the mold is merely incidental and serves no useful purpose.

A second blast of compressed air, made up of two cooperating blasts, indicated in Fig. 7 by small arrows 203, 204, is provided to aid in ejecting the molded preform from the machine. Referring again to Fig. 1, part of the compressed air from the pipe of entry 193 flows through a pipe 205 into a valve casing 207. The valve in the casing has a downwardly projecting stem, the valve being continually urged down into closed position by a compression spring, not shown. The valve is opened when the plunger 15 reaches its uppermost position, as shown in Fig. 1, by reason of the fact that the top of the guide 53 contacts with the bottom of the stem of the valve and pushes it up. When the valve is open, compressed air flows from the valve casing 207 through a flexible pipe 211 into the upper end of a rigid pipe 213 fastened to the under side of the swinging chute 27. This pipe 213 (Fig. 7) is forked at its lower end; and from the ends of the two branches merge the two blasts of air indicated by the reference numerals 203, 204. Thus, when the parts of the machine are in the position shown in Fig. 6, with the plunger at the top of its stroke, the knockout pin 33 beginning its descent and the chute 27 about to move to the right, the blasts of air from the forks at the lower end of the pipe 213 are blowing against the molded preform.

In the making of preforms, the ingredients of the molding compound are mixed by being tumbled together instead of being ground together as is commonly done. The bulky molding compound is then given a preliminary heating by blowing through it heated humidified air, humidified air being used so as to prevent complete drying of the fibrous content of the compound and to maintain a small moisture content of said fibrous material of, say, 4% or 5% by weight. A quantity of molding compound thus preheated is poured into the rotating drum 73, being maintained at a temperature of about 140° F. by the heater and fan 107 in the box 71 in which the drum is located.

Assuming that the mold has been filled and the parts are in the positions shown in Fig. 4 with the plunger 15 descending and the chute 27 swinging to the left, there may be at this time some particles of molding compound scattered over the flat top of the mold. When the plunger has descended far enough so that it is lower than and has entered the mold, the valve 199 (Fig. 1) is opened for a moment, and a series of small jets of compressed air are blown across the top of the mold. The plunger continues its descent to the position shown in Fig. 5 at which time the measuring slide 65 has been pulled out and has delivered a charge of molding compound into the hopper 29, the hinged bottom of which is still closed. At this time the latches 163, 363 (Figs. 1 and 3) have engaged the under side of the long horizontal bar 153 and, when the plunger rises, the bar is lifted to cause the knockout pin to push the molded preform out of the mold, as shown in Fig. 6. In the position of parts there shown, the plunger has reached the top of its stroke, and the latches have released the long bar 153 which carries the knockout pin, and two blasts of air from the forked end of the pipe 213 are being directed against the rear side of the preform. The chute 27 cannot swing farther to the right since its small stripping plate 34 extends beneath the rear part of the preform into contact with the upper end of the descending knockout pin 33. The moment the knockout pin falls below the level of the projecting end of the plate 34, the chute swings to the right until the vertical face at the upper end of the cam 119 strikes the alined adjacent edges of the plates 131, 135. The swinging of the chute to the right, together with the blasts of air from the forked end of the pipe 213, ejects the molded preform from the machine; and the swinging of the long arm 117 and the cam 119 also opens the hinged door 31 and permits a charge of molding compound to flow from the hopper 29 down the chute 27 into the mold. Practically instantly the plunger begins another descent and the parts pass once more through the positions shown in Fig. 4.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:

1. A machine of the class described, having in combination a mold member, a cooperating plunger member, one of said members being heated, means for reciprocating the plunger, said plunger having a head, a swinging cam member yieldingly urged at all times toward said head, a chute for feeding molding compound into the mold, said chute being rigid with the cam member and adapted to be swung away from the mold as the plunger moves toward the mold and into feeding position as the plunger moves away from the mold, and means operated by the plunger for delivering a measured charge of molding compound to the chute.

2. A machine of the class described, having in combination a mold, a cooperating plunger, means for producing relative reciprocation of the mold and plunger to cause the plunger to enter and to be withdrawn from the mold, a pivoted, downwardly extending chute movable back and forth from an inoperative position in which its free end is out of register with the mold cavity to an operative position in which its free end is in such register, means for supplying to the upper part of the chute just before it reaches operative position a measured charge of molding compound, and means controlled by the movement of reciprocation for actuating the chute and the means for supplying a measured charge to the chute.

3. A machine of the class described, having in combination a mold, a cooperating plunger, means for producing relative reciprocation of the mold and plunger to cause the plunger to enter and to be withdrawn from the mold, a pivoted, downwardly extending chute movable back and forth from an inoperative position in which its free end is out of register with the mold cavity to an operative position in which its free end is in such register, means for supplying to the upper part of the chute just before it reaches operative position a measured charge of molding compound, means for pushing a molded article out of the mold, said chute having at its free end a plate which ejects from the machine a previously molded article during the last part of the movement of the chute to its operative position, and means controlled by the movement of reciprocation for actuating the chute, the means for supplying a measured charge to the chute and the means for pushing a molded article out of the mold.

4. A machine of the class described, having in combination a mold, a cooperating plunger, means for producing relative reciprocation of the mold and plunger to cause the plunger to enter and be withdrawn from the mold, a receptacle for a supply of molding compound, a swinging chute for feeding molding compound to the mold, a slide, means for causing the slide to enter the receptacle to receive a charge of molding compound and to carry out said charge and supply it to the chute, and means controlled by the relative movement of reciprocation of the mold and plunger for operating the slide and for swinging the chute.

5. A machine of the class described, having in combination a mold, a cooperating plunger adapted to compress a charge of molding compound in the mold, a movable feed member adapted to receive a charge of molding compound and feed it into the mold, a hopper located above the feed member said hopper having a bottom yieldingly held in closed position but movable to open position to transfer a charge of molding compound to the feed member, a receptacle for holding a supply of molding compound, a slide for removing a measured charge of molding compound from the receptacle and transferring it to the hopper while the bottom of the hopper is closed, means for producing relative reciprocation of the mold and plunger, and means controlled by said movement for reciprocating the slide, for opening the bottom of the hopper and for moving the feed member.

6. A machine of the class described, having in combination a mold, a cooperating plunger adapted to compress a charge of molding compound in the mold, a knockout pin for pushing the molded article out of the mold, a feed member movable into a position to deliver a charge of molding compound to the mold and to eject from the machine a previously molded article which has been pushed out of the mold by the knockout pin, a hopper located above the feed member said hopper having a bottom yieldingly held in closed position but movable to open position to transfer a charge of molding compound to the feed member, a receptacle for a supply of molding compound, a slide for removing a measured charge of molding compound from the receptacle and transferring it to the hopper while the bottom of the hopper is closed, means for producing relative movement of reciprocation between the mold and plunger, and means controlled by said movement for reciprocating the measuring slide, for opening the bottom of the hopper, for moving the feed member and for operating the knockout pin.

7. A machine of the class described, having in combination a mold adapted to receive a charge of molding compound, a cooperating plunger, means for producing relative reciprocation of the mold and plunger to cause the plunger to compress a charge in the mold, a feed member adapted to receive a charge of molding compound and feed it into the mold, a measuring slide, a substantially horizontal drum for holding a supply of molding compound, means for rotating the drum, said drum being provided on its interior surface with vanes whereby molding compound is continually lifted from the lower side of the drum and dropped from the upper side, and means controlled by the relative movement of reciprocation for causing the measuring slide to move into the drum to be filled with a charge of molding compound and out of the drum to deliver its charge to the feed member.

FRANK S. GREGORY, Jr.